United States Patent
Wang et al.

(10) Patent No.: US 10,439,752 B2
(45) Date of Patent: Oct. 8, 2019

(54) OPTICAL SWITCH CONTROL CIRCUIT FOR OPTICAL NETWORK PROTECTION

(71) Applicant: OW Holding Inc., New Taipei (TW)

(72) Inventors: Sichao Wang, Wuhan (CN); Chenlei Shao, Kunshan (CN); Sheng Zhou, Zhuzhou (CN); Yuming Xu, TianMen (CN); Chen Zhang, Jiangsu (CN); Chuanxing Zhu, Fremont, CA (US); Yanyan Ma, San Jose, CA (US)

(73) Assignee: OptiWorks (Kunshan) Co., Ltd., Kunshan (CN)

( * ) Notice: Subject to any disclaimer, the term of this patent is extended or adjusted under 35 U.S.C. 154(b) by 0 days.

(21) Appl. No.: 15/876,060

(22) Filed: Jan. 19, 2018

(65) Prior Publication Data
US 2019/0229832 A1    Jul. 25, 2019

(51) Int. Cl.
*H04J 14/00* (2006.01)
*H04J 14/02* (2006.01)
*H04Q 11/00* (2006.01)

(52) U.S. Cl.
CPC ...... *H04J 14/0287* (2013.01); *H04J 14/0269* (2013.01); *H04J 14/0283* (2013.01); *H04Q 11/0005* (2013.01)

(58) Field of Classification Search
CPC .............. H04J 14/0287; H04J 14/0269; H04J 14/0283; H04Q 11/0005; H04Q 11/0001; H04Q 11/0003; H04Q 3/525; H04Q 3/528

USPC .......................................... 398/1, 12, 19, 45
See application file for complete search history.

(56) References Cited

U.S. PATENT DOCUMENTS

| | | | | |
|---|---|---|---|---|
| 5,317,198 A | * | 5/1994 | Husbands | ............. H04L 12/423 250/227.11 |
| 2006/0104641 A1 | * | 5/2006 | Casanova | ........... H04J 14/0204 398/83 |

* cited by examiner

*Primary Examiner* — Mohammad R Sedighian
(74) *Attorney, Agent, or Firm* — Intellectual Property Law Group LLP

(57) ABSTRACT

Optical switch control circuit for optical network protection. In an exemplary embodiment, an apparatus includes a latching optical switch that routes signals in an optical network. The apparatus also includes a switch control circuit coupled to the latching optical switch. The switch control circuit controls the latching optical switch to selectively operate in a latching mode or in a non-latching mode based on a received command and a network power state. A method is disclosed that includes receiving a command that indicates how optical signals are to be routed by a latching optical switch, and determining a resulting routing state based on a current routing state, the command, and a power state. The method also includes controlling the latching optical switch to operates in the resulting routing state such that the latching optical switch selectively operates in a latching mode or in a non-latching mode.

18 Claims, 6 Drawing Sheets

OPTICAL SWITCH CONTROL CIRCUIT FOR OPTICAL NETWORK PROTECTION

FIELD OF THE INVENTION

The exemplary embodiments of the present invention relate generally to the field of communication networks, and more specifically to the protection of optical networks.

BACKGROUND OF THE INVENTION

Optical networks transmit information encoded into light signals among various nodes of a telecommunications network. These networks can be configured to operates as local-area network (LAN) or wide-area network (WAN). Because optical networks are capable of achieving extremely high bandwidth, such networks are well suited for use in Internet and telecommunication applications.

However, optical networks are susceptible to the same types of problems that affect electronic networks. For example, optical connections between the nodes may fail or power outages may degrade performance or limit operation. To address these problems, optical networks have been developed with various protections mechanisms that attempt to re-route optical transmissions in the event of a connection failure or power outage.

The optical switch is a key component in a protection system. There are two types of optical switches, namely, a non-latching type and a latching type. Both types operate in a known way when power is removed. For example, the non-latching type optical switch will switch to a bypass mode or "power off state" when power is removed. The latching type optical switch will latch and maintain the light path used when power is lost. These are considered "physical" protection mechanisms used in conventional network protection solutions.

Unfortunately, when upgrade and maintenance of network occurs or when power is off, these physical protection mechanisms can't adjust the light path according to new requirements. This is because the optical switch changes the light path to the protection mode automatically. This results in networks that lack flexibility and performance.

Therefore, it is desirable to have a mechanism for use in optical networks that provides enhanced flexibility in routing signals and that provides greater flexibility than physical protection modes to protect optical networks in the event of network failures or power outages.

SUMMARY

A novel optical switch control circuit is disclosed. In various exemplary embodiment, the switch control circuit operates to provide network protection to compensate for network disruptions and power outages. A latching switch and the switch control circuit comprise a protection system that can realize both latching and non-latching switch operations. The switch control circuit operates under user control to implement logical protection modes in additional to physical protection modes provided by the latching switch. The switch control circuit includes logic and associated routing tables to provide a variety of logical and physical protection configurations.

In an exemplary embodiment, the switch control circuit interfaces with a latching optical switch in an optical network to control the switch to provide both latching and non-latching functionality. The switch control circuit operates under user control to re-route signals of the optical network to compensate for network disruptions. The switch control circuit also includes a backup power supply that provides temporary power to implement routing configurations in case of power outages.

In an exemplary embodiment, an apparatus is disclosed that includes a latching optical switch that routes signals in an optical network. The apparatus also includes a switch control circuit coupled to the latching optical switch. The switch control circuit controls the latching optical switch to selectively operate in a latching mode or in a non-latching mode based on a received command and a network power state.

In an exemplary embodiment, a method is disclosed that includes receiving a command that indicates how optical signals are to be routed by a latching optical switch, and determining a resulting routing state based on a current routing state, the command, and a power state. The method also includes controlling the latching optical switch to switch to the resulting routing state such that the latching optical switch selectively operates in a latching mode or in a non-latching mode.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Those of ordinary skilled in the art will realize that the following detailed description is illustrative only and is not intended to be in any way limiting. Other embodiments of the present invention will readily suggest themselves to skilled persons having the benefit of this disclosure. Reference will now be made in detail to implementations of the exemplary embodiments of the present invention as illustrated in the accompanying drawings. The same reference indicators or numbers will be used throughout the drawings and the following detailed description to refer to the same or like parts.

Figure 1:
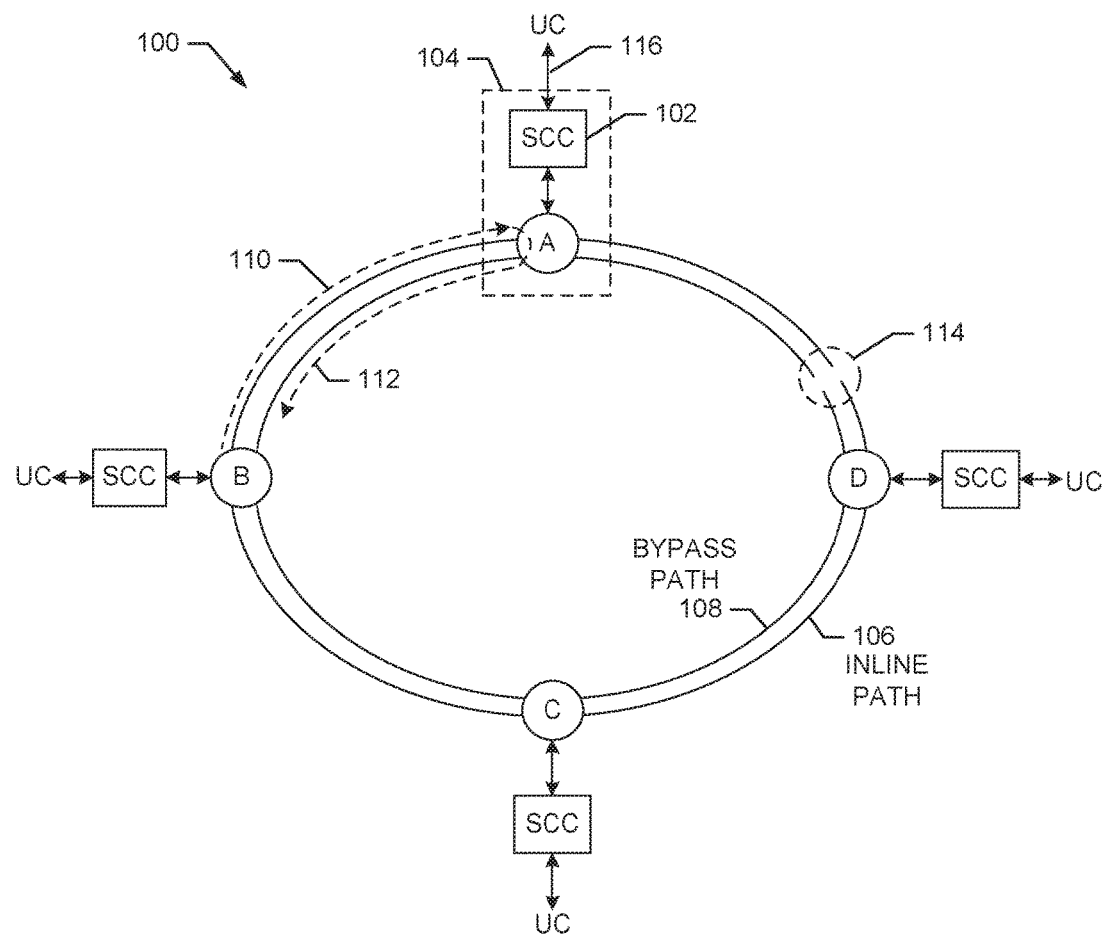
FIG. 1 shows an exemplary optical network that includes an exemplary embodiment of a switch control circuit (SCC)

FIG. 1 shows an exemplary optical network 100 that includes an exemplary embodiment of a switch control circuit (SCC). The optical network 100 includes four optical switches (A, B, C, D) that are connected by optical fibers to form an outer ring (referred to as a working or inline path 106), and an inner ring (referred to as a protection or bypass 108 path). It should be noted that each optical switch may include one or more switches that operate to switch optical signals around the optical network 100 and/or around other additional optical networks (not shown).

As illustrated in FIG. 1, each optical switch is coupled to its own SCC. For example, the optical switch A is coupled to the SCC 102 to form a switching apparatus 104. The SCC 102 controls the operation of the optical switch A based on user control (UC) commands 116 that are received by the SCC 102. In exemplary embodiment, the UC commands 116 are received from a user or network controller that manages and controls the operation of the optical network 100. For example, in one embodiment, a separate bus is used to transmit the UC commands to each SCC from a central network controller.

In an exemplary embodiment, the UC commands 116 are used by the SCC 102 to control how the optical switch A routes optical signals under varying conditions. In one embodiment, the UC commands cause the SCC to implement logical network protections to actively manage how signals are routed on the optical network. The logical network protections actively manage the operation of the optical switch such that a latching optical switch can be controlled to perform as either a latching optical switch or a non-latching optical switch. For example, in the event of a network disruption (as shown at 114) the SCC 102 controls switch A to route an optical signal 110 traveling on the in-line path 108 from switch B to switch A, back to switch B (see optical signal 112) on the bypass path 108. The actively managed signal routing provides greater flexibility and performance over conventional systems during both normal network operation and in response to failure events. More detailed descriptions of the design and operation of the SCC are provided below.

Figure 2:
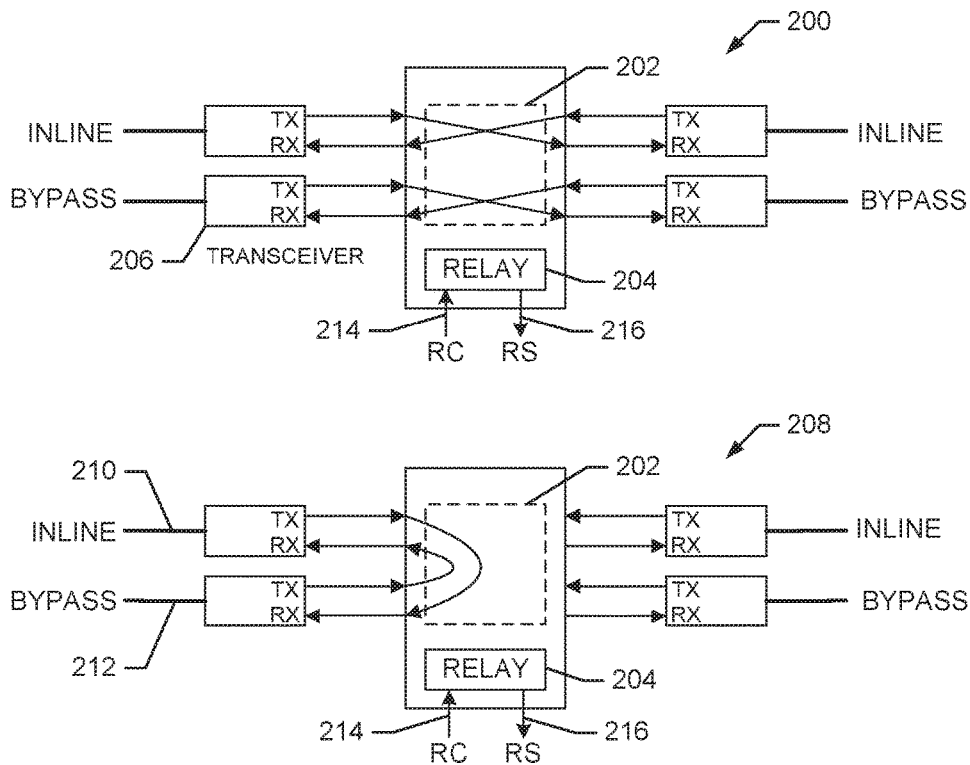
FIG. 2 shows an exemplary embodiment of an optical switch and illustrates inline and bypass operations.

FIG. 2 shows an exemplary embodiment of an optical switch 200 and illustrates inline and bypass operations. For example, the optical switch 200 is suitable for use as any of the optical switches (A, B, C, D) shown in FIG. 1. In an exemplary embodiment, transceiver circuits (e.g., transceiver circuit 206) receive and transmit optical signals over optical fibers that form inline and bypass signal paths. An optical switching mechanism 202 redirects the optical signals to the desired optical fiber. In an exemplary embodiment, the optical switching mechanism 202 includes one or more mirrors or prisms that are repositioned to direct the optical signal to the appropriate fiber. A latching relay 204 moves the mirrors or prisms to the appropriate positions to direct an optical signal to the selected fiber. The latching relay 204 receives relay control (RC) signals 214 that control how the relay 204 operates to control the switch mechanism 202. The latching relay 204 also outputs relay state (RS) signals 216 that indicate the current relay state (e.g., inline position or bypass position).

In an exemplary embodiment, the switch 200 is a 2×2 switch that switches two optical paths based on the state of the relay 204. In a first state of the relay, shown by optical switch 200, inline routing is performed, and in a second state of the relay, shown by optical switch 208, bypass routing is performed. For example, during bypass routing, signals traveling on the inline paths are switch over to the bypass or protection paths. Additionally, the switch 200 can be expanded to a multi-channel switch, such as dual (2) 2×2 switch, a quad (4) 2×2 switch or an octo (8) 2×2 switch. By providing multi-channel switching, a switch module comprising multiple 2×2 switches can provide multi-channel protection.

Figure 3:
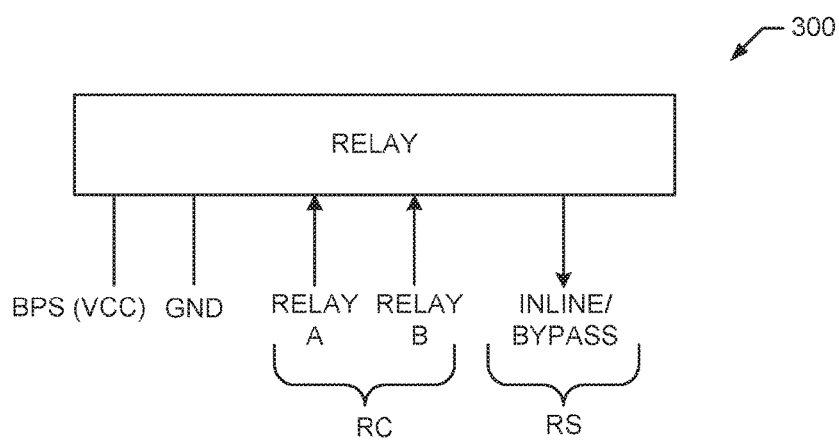
FIG. 3 shows an exemplary embodiment of a latching relay for use in an optical switch.

FIG. 3 shows an exemplary embodiment of a latching relay 300 for use in an optical switch. For example, the relay 300 is suitable for use as the relay 204 shown in FIG. 2. In an exemplary embodiment, the relay 300 provides latching operation to control the switching mechanism 202. In another exemplary embodiment, a microelectromechanical system (MEMS) switch may be utilized in place of the relay 300, but a MEMS switch may have higher cost and lower yield, especially due to the lower mechanical reliability.

The relay 300 receives backup power supply (BPS) (VCC) and ground (GND) reference voltages. The backup power supply (VCC) is described in more detail below. The relay 300 also receives RC signals comprising a Relay A signal and a Relay B signal. These signals control the direction of the relay movement. The relay 300 outputs a relay state signal that comprises an inline/bypass signal that indicates the current state of the relay (e.g., indicates whether the relay (and the switch mechanism 202) are in the inline or bypass routing position).

Figure 4:
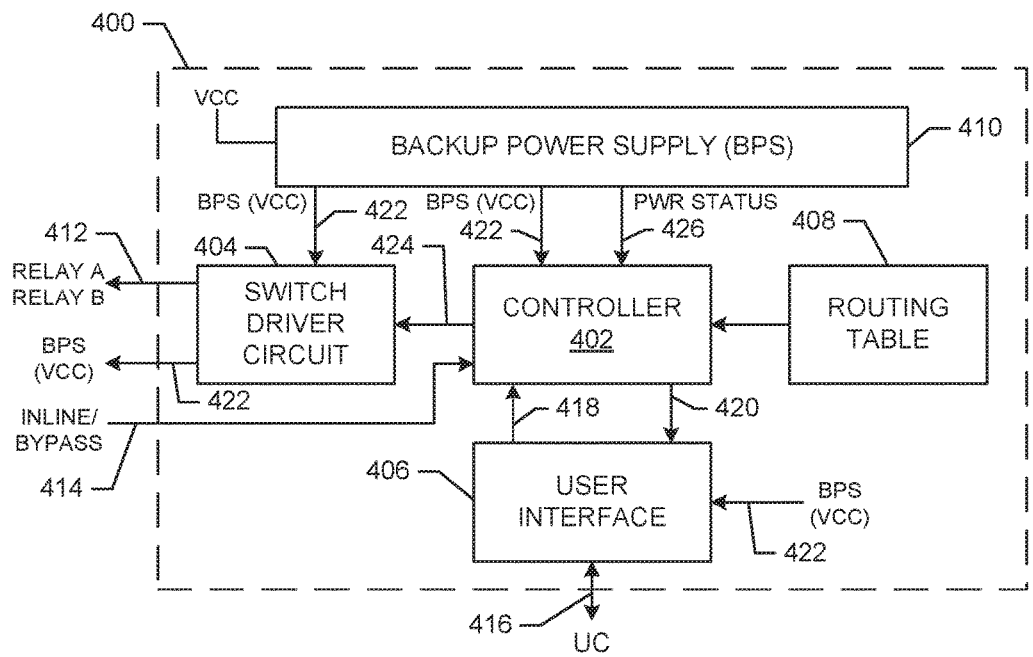
FIG. 4 shows an exemplary embodiment of a switch control circuit (SCC) that provides actively managed optical routing and network protection.

FIG. 4 shows an exemplary embodiment of a switch control circuit (SCC) 400 that provides actively managed optical routing and network protection. For example, the SCC 400 is suitable for use as any of the SCC circuits shown in FIG. 1. The SCC 400 comprises controller 402, switch driver circuit 404, user interface 406, routing table 408 and backup power supply (BPS) 410.

In exemplary embodiments, the controller 402 comprises at least one of a processor, CPU, controller, micro-controller, state machine, programmable logic, memory, registers, logic, discrete devices and/or other suitable hardware to perform the functions described herein. The controller 402 receives UC commands 416 from a network operator through the user interface 406. The commands 416 direct the controller 402 to control how the switch driver circuit 404 drives an optical switch to route optical signals on the network. The controller 402 also receives relay state (inline/bypass) signal 414 from a latching switch relay and outputs status information 420 to the network operator through the user interface 406. In an embodiment, the output status is part of the UC commands 416 signaling. The controller 402 also receives a power status indicator 426 from the backup power supply (BPS) 410.

In an exemplary embodiment, the user interface 406 comprises at least one of a CPU, processor, state machine, programmable logic, controller, memory, registers, logic, discrete components and/or other suitable hardware to implement the functions described herein. The user interface 406 received UC commands 416 from a network operator and passes these commands to the controller 402 for processing. The user interface 406 also receives status information 420 from the controller 402 and passes this information to the network operator.

In an exemplary embodiment, the routing table 408 describes switch routing paths to achieve a desired signal routing on an optical network. In an exemplary embodiment, the routing table 408 is stored in a separate memory that is accessible by the controller 402. In another embodiment, the routing table 408 is stored in an internal memory of the controller 402.

In an exemplary embodiment, the controller 402 receives the relay state (inline/bypass) 414, UC commands 416, and power status 426 and utilizes this information to access the routing table 408. The routing table 408 provides routing information that is used by the controller 402 to generate switch drive signals 424 that are used by the switch drive circuit 404 to drive the latching relay of an optical switch to achieve a desired signal routing.

In an exemplary embodiment, the switch driver circuit 404 comprises at least one of power transistors, level shifters, registers, logic, discrete components and/or other hardware suitable to perform the functions described herein. The switch driver circuit 404 receives switch drive signals 424 and converts these signals into the relay drive signals (Relay A/Relay B) 412 to drive a relay of an optical switch.

In an exemplary embodiment, the BPS 410 comprises a large (super) capacitor that stores charge. In the event of a power failure, the charged super capacitor can provide enough power to maintain the operation of the optical switch and SCC for a short time duration to allow selected signal routing to be completed. The BPS 410 also outputs the power status indicator 426 that allows the controller 402 to monitor the state of the network power.

During exemplary operation, the controller 402 receives UC commands 418 received by the user interface 406. The controller 402 also acquires the current relay state 414 and the power status 426. The controller 402 uses current relay state 414, received commands 418, and power status 426 to access the routing table 408 to determine signal routing to be applied to an optical switch to achieve a desired optical signal routing path. The controller 402 determines the switch drive signals necessary to achieve the desired signal routing. The controller 402 outputs the switch drive signals 424 to the switch drive circuit 404. The switch drive circuit 404 converts the switch drive signals 424 into relay control signals (Relay A/Relay B) 412 that are output to a latching relay of an optical switch. The relay control signals 412 control the optical switch to function as either a latching and a non-latching optical switch. Thus, a plurality of optical signal routings are possible that are not possible with conventional network protection system that use only one type of optical switch to provide physical protection. The BPS 410 provides short term temporary power BPS (VCC) 422 in the event of a power failure to continue operation of the SCC 400 and the optical switch to complete signal routing in response to a power failure. Thus, the SCC 400 interfaces with a latching optical switch in an optical network to control the switch to provide both latching and non-latching functionality.

Figure 5:
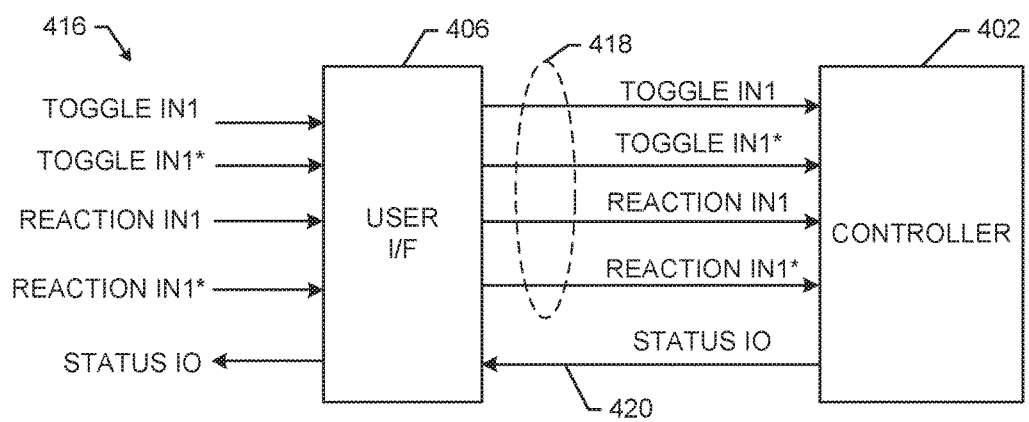
FIG. 5 shows detailed exemplary embodiments of a controller and a user interface shown in FIG. 4.

FIG. 5 shows detailed exemplary embodiments of the controller 402 and the user interface 406 shown in FIG. 4. In exemplary embodiments, the user interface 406 comprises at least one of a processor, state machine, programmable logic, memory, registers, logic, discrete components and/or other hardware suitable to perform the functions described herein. The user interface 406 receives UC commands 416 and passes these commands to the controller 402. The UC commands include four signals, namely: Toggle IN1, Toggle IN1*, Reaction IN1, and Reaction IN1* that are combined into a customer command received by the user interface 406. The user interface 406 receives these commands and sends them to the controller 402. The user interface also receives, from the controller 402, a status IO signal 420 that indicates the state of the relay and sends this signal to the user.

Figure 6:
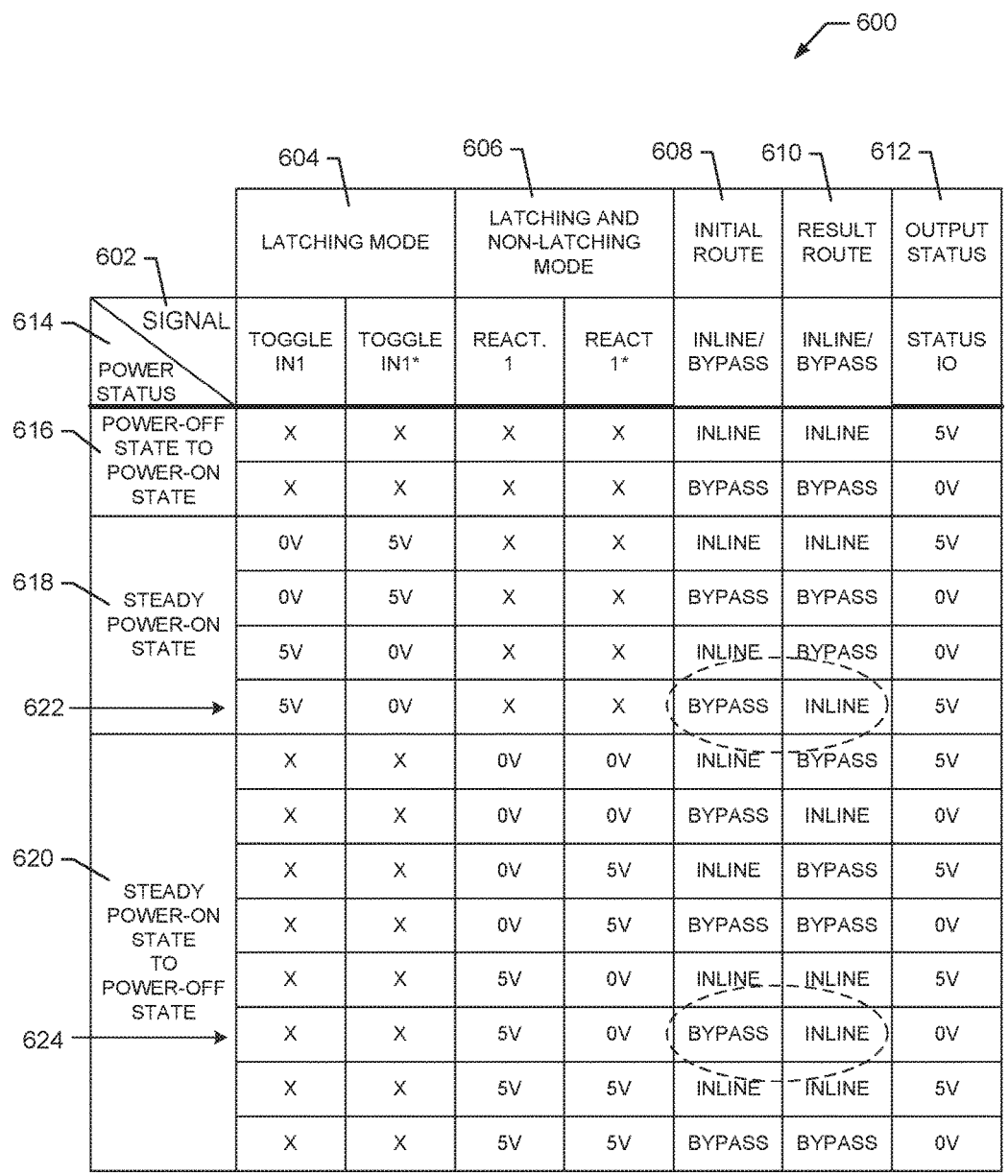
FIG. 6 shows an exemplary embodiment of a routing table for use with a switch control circuit shown in FIG. 4.

FIG. 6 shows an exemplary embodiment of a routing table 600 for use with the switch control circuit shown in FIG. 4.

In an exemplary embodiment, there are fourteen (14) routing entries in the routing table that indicate optical switch routings that produce latching and non-latching switch operation based on various commands, switch state, and power events. In conventional solutions, an optical switch acts in either a latching or non-latching mode, thereby providing only limited routing flexibility and limited network protection. In various exemplary embodiments, the SCC utilizes the routing table 600 to control a latching optical switch to perform both latching and non-latching functions, thereby providing increased flexibility and enhanced network protection.

The routing table 600 comprises a top row that shows operational modes and route status indicators. For example, the top row of the routing table 600 shows indicators for latching mode 604, non-latching mode 606, initial route 608, resulting route 610 and output status 612. The second row of the routing table shows signals 602 associated with the modes and status of the top row and that identify the signals that are input to and output from the controller 402. For example, the second row of the routing table 600 shows the signals Toggle IN1, Toggle IN1*, Reaction IN1, Reaction IN1*, and inline/bypass that represent signals received by the controller 402. The second row also shows a status IO signal that identifies a status signal output from the controller 402 to the user interface 406 for output to the user.

The next sections of the routing table show routing paths associated with power status events 614. For example, the power status events include power-off state to power-on state (616), steady power-on state (618), and steady power-on state to power-off state (620). In an exemplary embodiment, the controller 402 determines the power status event based on the received power status indicator 426. Based on these power status events, user commands are interpreted to determine how an optical switch routing is to be set.

In an exemplary embodiment, the controller 402 determines the power state event 616 when the power status indicator 426 transitions from a low voltage state (logical 0) to a high voltage state (+5 v, logical 1) indicating that 5 v power has become available to the network. For example, when the power state event 616 is detected, the resulting routing 610 is the same as the initial routing 608, regardless of the state of the received user input signals. Thus, when the power state event 616 happens the optical switch state indicated by the inline/bypass signal 414 (which indicates the initial route 608) is maintained as the resulting route 610.

In an exemplary embodiment, the controller 402 determines the power state event 618 when the power status indicator 426 maintains a high voltage state (+5 v, logical 1) indicating that steady 5v power is available to the network. When the power state event 618 is detected, the switch routing is adjusted based on the received Toggle IN1 and Toggle IN1* signals and the initial routing 608 determined from the current relay state (e.g., inline/bypass indicator 414). The Reaction IN1 and Reaction IN1* bits are ignored. Thus, as indicated at 622, if the initial routing of the switch is in bypass mode (initial route 608) when the power state event 618 occurs, and the received Toggle IN1 is 5 v and the received Toggle IN1* is 0 v, then the switch is controlled to switch to inline routing as the result route 610. For example, the controller 402 outputs drive control signals 424 to cause the relay to configure the switch to inline routing mode. Once the switch transition is complete, the controller 402 outputs the status IO to the user interface 406 for transmission to the user.

In an exemplary embodiment, the controller 402 determines the power state event 620 when the power status indicator 426 transitions from a high voltage state (+5 v, logical 1) to a low voltage state (0 v, logical 0) indicating that 5 v power has been lost and is not available to the network. When the power state event 620 occurs, the switch routing is adjusted based on the received Reaction IN1 and Reaction IN1* bits. The Toggle IN1 and Toggle IN1* bits are ignored. Thus, as indicated at 624, if the switch is in bypass mode (indicated by initial route 608) when the power state event 620 occurs, and the received Reaction IN1 is 5 v and the received Reaction IN1* is 0 v, then the switch is controlled to switch to inline routing mode. For example, the controller 402 outputs drive control signals 424 to cause the relay to configure the switch to inline routing mode. It should be noted that when in the power state 620, the BPS power 422 provides power to the SCC and the optical switch, thereby allowing switch routing to be set even though network power has been lost.

Thus, the table 600 provides optical switch routing under user control for multiple power status events so that a latching optical switch can be controlled to operate in both latching and non-latching modes.

Figure 7:
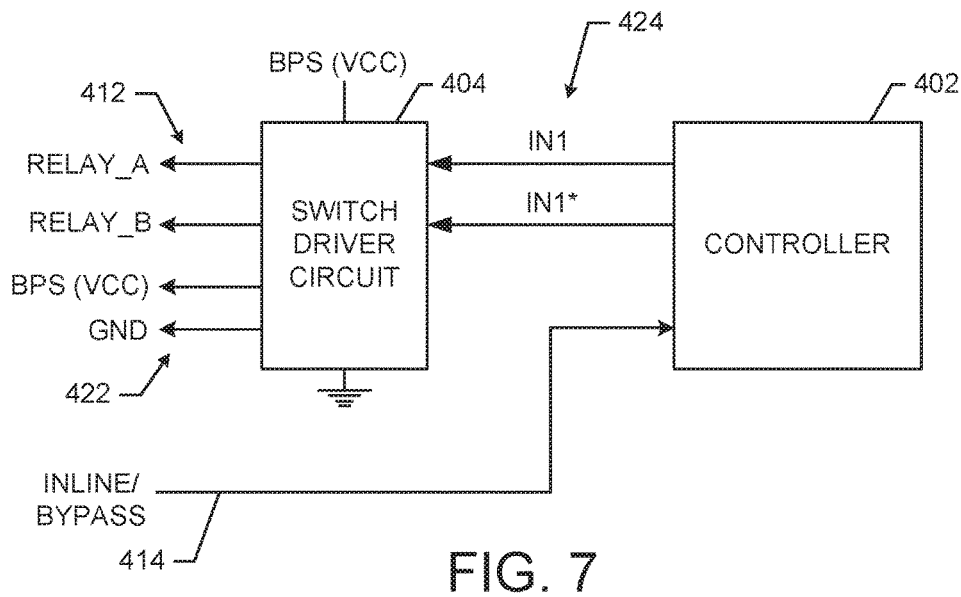
FIG. 7 shows detailed exemplary embodiments of a controller and a switch driver circuit a shown in FIG. 4.

FIG. 7 shows detailed exemplary embodiments of the controller 402 and the switch driver circuit 404 shown in FIG. 4. In exemplary embodiments, the switch driver circuit 404 comprises at least one of a state machine, programmable logic, voltage drivers, current drivers, level translators, registers, logic, discrete components and/or other hardware suitable to perform the function described herein.

The switch driver circuit 404 receives switch drive signals 424 (IN1 and IN1*) from the controller 402 and uses these inputs to generate relay drive signals 412 that drive the relay of the optical switch. The switch driver circuit 404 also provides BPS power 422 to the relay thereby maintaining the ability of the relay to be operated in the case of a power outage.

The controller 402 receives relay state (inline/bypass) signal 414 that indicates the current state of the relay. For example, the inline/bypass signal 414 indicates whether the relay is in inline or bypass mode. In an exemplary embodiment, the controller 402 utilizes the state information 414 received from the relay and the UC command inputs from the user interface to generate the switch control signals 424. For example, the controller 402 uses the relay state information and the UC command inputs to access the table 600 to determine how the relay is to be controlled to achieve a desired resulting routing configuration. The controller 402 then generates the switch control signals 424 to achieve the routing result. Thus, a logical protection mode is implemented whereby the optical switch can be set based on the routing table 600 to achieve both latching and non-latching functionality.

Figure 8:
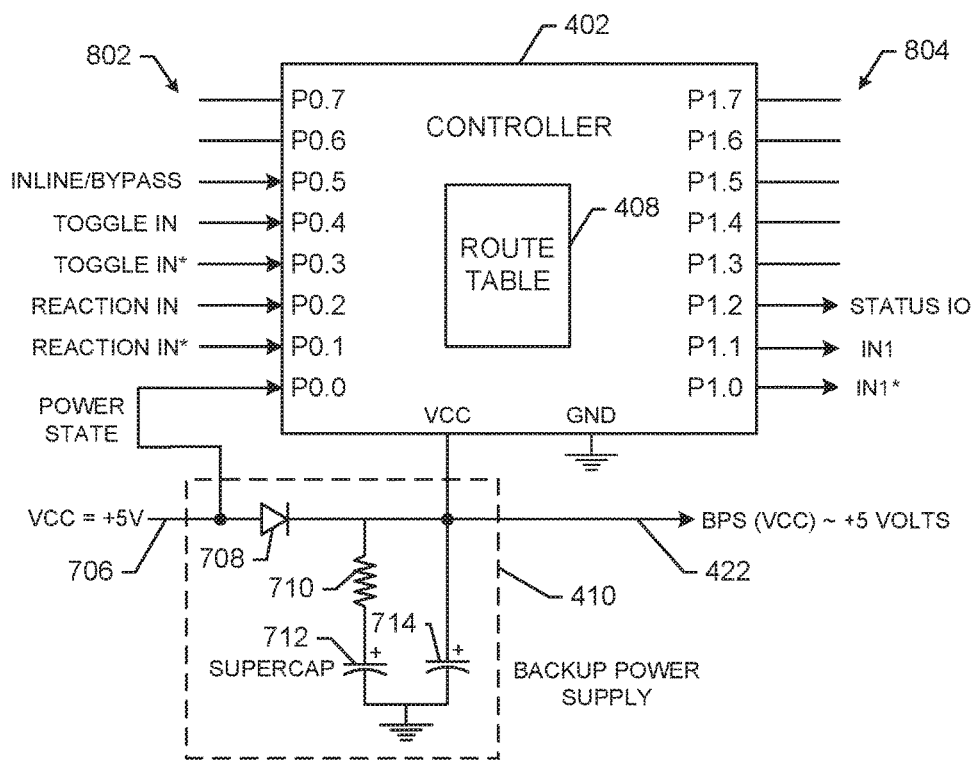
FIG. 8 shows an exemplary embodiment of a controller and a backup power supply shown in FIG. 4.

FIG. 8 shows an exemplary embodiment of the controller 402 and the backup power supply 410 shown in FIG. 4. In an exemplary embodiment, the BPS 410 includes diode 708, filter capacitor 714, resistor 710 and capacitor (SUPERCAP) 712. The diode 708 has an input connected to VCC power (+5 v) 706 provided by the optical network. An output of the diode 708 is connected to a first terminal of the resistor 710 and a positive input of the filter capacitor 714. A second terminal of the resistor 710 is connected to a positive input of the SUPERCAP 712. In an exemplary embodiment, SUPERCAP 712 has a capacitance value that is large enough to maintain power to the SCC and the optical switch until a resulting switch configuration can be completed. The second terminals of the SUPERCAP 712 and filter capacitor 714 are connected to system ground.

During operation, the SUPERCAP 712 stores charge received from the network supplied VCC power input 706. If the VCC power 706 fails, the BPS 422 provides power from the charged stored in the SUPERCAP 712 to provide the BPS (VCC) power 422. The stored charge is enough to power the SSC and optical switch for a short time duration to allow additional switch routing configurations to be implemented. For example, in an exemplary embodiment, the capacitor 712 stores enough charge to power the SCC to complete the determination of the desired routing state by the controller 402 and for the controller 402 to output relay control signals to the switch driver circuit 404 to active the switch relay to enable the desired routing state. For example, when the power state changes from the "steady power-on state" to the "power-on to power-off state", the capacitor 712 stores enough charge so that there is enough power for the controller 402 and the switch driver 404 to change the routing of the switch based on the table 600. In an exemplary embodiment, the VCC power (+5 v) 706 is input to the controller 402, which operates to monitor this input to determine the power states shown in FIG. 6.

In an exemplary embodiment, the controller 402 comprises a single chip micro controller or state machine that has two input/output ports (P0 802 and P1 804) and memory to store the routing table 408. For example, the micro controller 402 executes internal instructions to write and read data to/from the I/O ports to control the operation of an optical switch. The first port P0 802 is used to receive the user inputs from the user interface 406, the inline/bypass relay state 414, and the power state 426. The second port P1 804 is user to output the relay drive signals 424 to the switch driver 404 and the status IO output to the user interface 406. It should be noted that other controllers having different input/output port arrangements can also be used.

Figure 9:
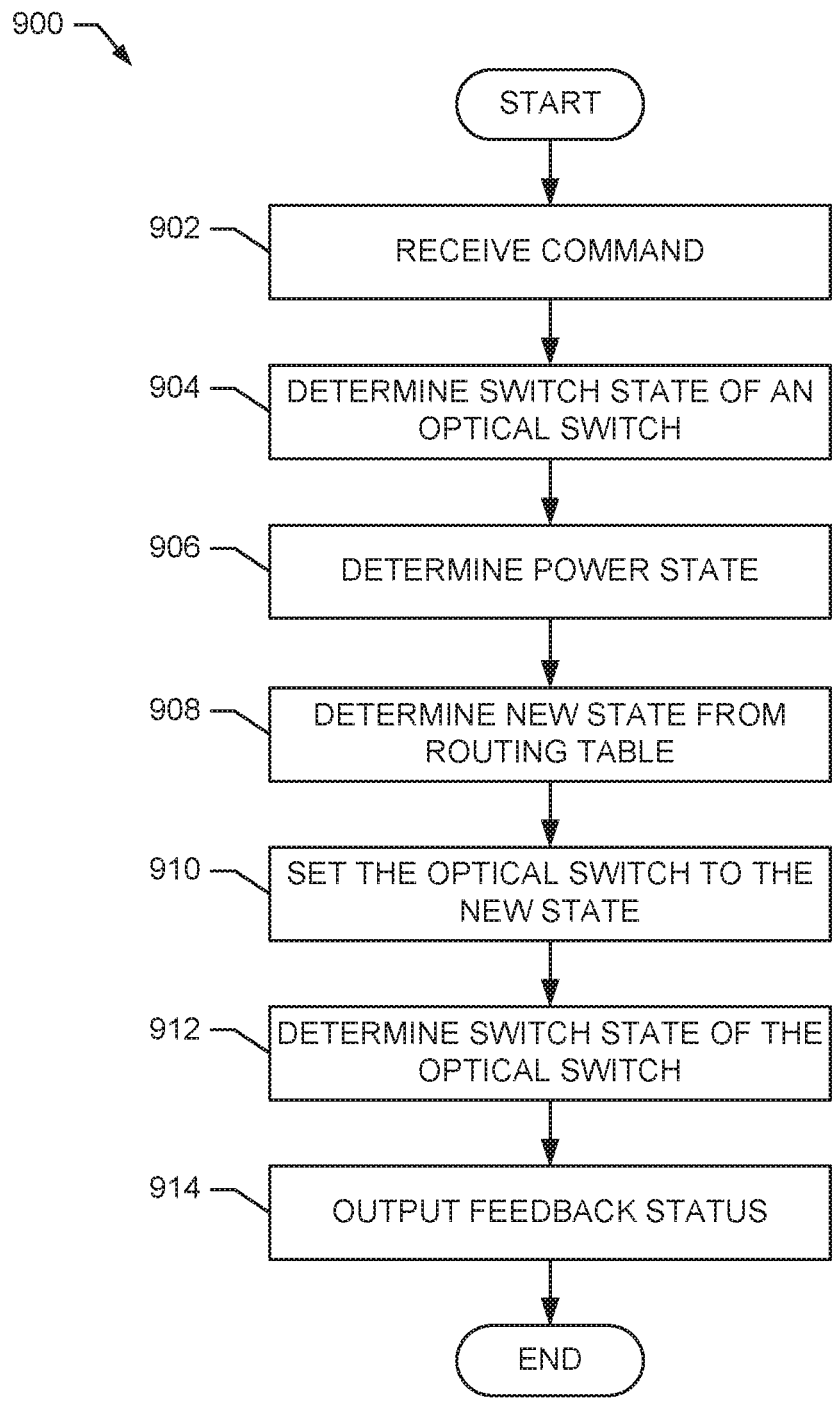
FIG. 9 shows an exemplary embodiment of a method for controlling an optical switch to provide logical network protections that comprise both latching and non-latching operation.

FIG. 9 shows an exemplary embodiment of a method 900 for controlling an optical switch to provide logical network protections that comprise both latching and non-latching operation. In an exemplary embodiment, the method 900 is suitable for use with the switch control circuit 400 shown in FIG. 4.

At block 902, a user command is received. For example, UC command 416 is received at the user interface 406 and passed to the controller 402. In an exemplary embodiment, the UC command comprise Toggle IN1, Toggle IN1*, Reaction IN1 and Reaction IN1* signals as shown in FIG. 5.

At block 904, the state of a relay of a latching optical switch is determined. For example, the state (inline/bypass) signal 414 of the relay connected to the switch driver circuit 404 is input to the controller 402. The state indicates whether an optical switch controlled by the relay is in an inline mode or a bypass mode.

At block 906, the state of power is determined. For example, the controller 402 receives the power status signal 426 and determines one of the power status states 614 shown in the table 600. For example, the controller 402 determines one of the power-off state to be the power on state 616, the steady power-on state 618, or the steady power-on to power-off state 620 shown in the table 600.

At block 908, the received UC commands, the relay state and the power state are used to determine a new relay state from a routing table. For example, the controller 402 uses the received command signals 418, the power state 614, and the state of the relay 414 to access the routing table 408. For example, the routing table shown in FIG. 6 can be accessed with the current state of the relay which is shown in the initial route column 608, the power status 614, and the UC command input signals which are shown under the corresponding signal names to determine a resulting route 610 to be set. For example, if the power status is steady power-on state 618, current state is "bypass" and the UC command input signals are "5 v, 0 v, X, X" then the row 622 is used to determine that the resulting routing state should be set to the inline routing state.

At block 910, the relay (and optical switch) are set to the newly determined state. For example, the controller 402 determines the new state from the routing table 408 and outputs the switch control signals 424 to the switch driver circuit 404 to control the optical switch to be configured to the new state.

At block 912, the state of a relay of a latching optical switch is determined. For example, the state (inline/bypass) signal 414 of the relay is input to the controller 402. The state indicates whether an optical switch controlled by the relay is in an inline mode or a bypass mode. As a result of setting the new state in block 908, the state of the optical switch should reflect this new state.

At block 914, feedback is provided to the user. For example, the controller 402 outputs status IO 420 indicating the new state of the relay to the user interface 406, which forwards this status information to the user. In an exemplary embodiment, the output status is provided from the output status 612 of the table 600. The controller 402 outputs the appropriate voltage from the table 600 to the user interface 406 on the status IO line 420.

Thus, the method 900 operates to control an optical switch to provide logical network protections that comprise both latching and non-latching operation. It should be noted that the method 900 is exemplary and that changes, modifications, additions and/or subtractions from the method 900 can be made within the scope of the exemplary embodiments.

While exemplary embodiments of the present invention have been shown and described, it will be obvious to those with ordinary skills in the art that based upon the teachings herein, changes and modifications may be made without departing from the exemplary embodiments and their broader aspects. Therefore, the appended claims are intended to encompass within their scope all such changes and modifications as are within the true spirit and scope of the exemplary embodiments of the present invention.

What is claimed is:

1. An apparatus, comprising:
   a latching optical switch that routes signals in an optical network;
   a switch control circuit coupled to the latching optical switch, wherein the switch control circuit controls the latching optical switch to selectively operate in a latching mode or in a non-latching mode based on a received command and a network power state; and
   a routing table that determines a routing mode for the latching optical switch based on the command, a current switch state and the network power state.

2. The apparatus of claim 1, wherein the latching optical switch comprises a latching relay.

3. The apparatus of claim 2, wherein the switch control circuit comprises a drive circuit that generates relay control signals that drive the latching relay in response to switch control signals generated by the switch control circuit.

4. The apparatus of claim 2, further comprising a backup power supply that provides backup power to the switch control circuit and the optical switch, and wherein the backup power maintains power to the switch control circuit and the optical switch during a power failure.

5. The apparatus of claim 1, wherein the network power state identifies one of a power-off state to power-on state transition, a steady power-on state, and a steady power-on state to a power-off state transition.

6. A method, comprising:
   receiving a command that indicates how optical signals are to be routed by a latching optical switch;
   determining a resulting routing state based on a current routing state, the command, and a power state;
   controlling the latching optical switch to operates in the resulting routing state, and wherein the latching optical switch selectively operates in a latching mode or in a non-latching mode.

7. The method of claim 6, wherein the latching optical switch comprises a latching relay and wherein the operation of controlling comprises generating relay control signals that drive the latching relay to enable the resulting routing state.

8. The method of claim 7, further comprising generating the relay control signals from switch control signals generated in response to the received command.

9. The method of claim 6, further comprising determining the resulting routing state from a routing table based on the current routing state, the command, and the power state.

10. The method of claim 6, further comprising providing backup power that maintains power after a power outage until the latching optical switch operates in the resulting routing state.

11. The method of claim 6, further comprising determining the power state as one of a power-off state to power-on state transition, a steady power-on state, and a steady power-on state to a power-off state transition.

12. The method of claim 6, further comprising outputting a status indicator that indicates that the latching optical switch operates in the resulting routing state.

13. The method of claim 6, further comprising receiving the command as user input received at a user interface.

14. An apparatus, comprising:
   means for switching signals between inline and bypass paths of an optical network, wherein the means for switching operates in a latching mode;
   means for controlling the means for switching to selectively operate in the latching mode or in a non-latching mode based on a received command and a network power state; and
   means for determining a resulting routing mode for the means for switching based on the command, a current switch state and the network power state.

15. The apparatus of claim 14, wherein the means for switching comprises a latching optical switch having a latching relay.

16. The apparatus of claim 15, wherein the means for switching comprises means for generating relay control signals that drive the latching relay in response to switch control signals generated by the means for switching.

17. The apparatus of claim 14, further comprising means for generating backup power to the means for switching and the means for controlling to maintain power during a power failure.

18. The apparatus of claim 14, wherein the network power state identifies one of a power-off state to power-on state transition, a steady power-on state, and a steady power-on state to a power-off state transition.

* * * * *